United States Patent
Morris et al.

(10) Patent No.: US 10,112,136 B2
(45) Date of Patent: Oct. 30, 2018

(54) FLUID LUBRICANT AND MATERIAL SHAVINGS RECAPTURE SYSTEM FOR A CUTTING OPERATION

(71) Applicant: Enviro-Fab LLC, Kennewick, WA (US)

(72) Inventors: Samuel J Morris, Kennewick, WA (US); Glenna V Zamora Morris, Kennewick, WA (US)

(73) Assignee: Enviro-Fab LLC, Kennewick, WA (US)

( * ) Notice: Subject to any disclaimer, the term of this patent is extended or adjusted under 35 U.S.C. 154(b) by 767 days.

(21) Appl. No.: 13/742,404

(22) Filed: Jan. 16, 2013

(65) Prior Publication Data
US 2013/0199987 A1  Aug. 8, 2013

Related U.S. Application Data

(60) Provisional application No. 61/594,779, filed on Feb. 3, 2012.

(51) Int. Cl.
| | |
|---|---|
| *B01D 35/30* | (2006.01) |
| *B23Q 11/00* | (2006.01) |
| *B23Q 11/10* | (2006.01) |
| *B01D 35/027* | (2006.01) |

(52) U.S. Cl.
CPC ......... *B01D 35/30* (2013.01); *B01D 35/0273* (2013.01); *B23Q 11/0067* (2013.01); *B23Q 11/1069* (2013.01); *Y02P 70/171* (2015.11)

(58) Field of Classification Search
None
See application file for complete search history.

(56) References Cited

U.S. PATENT DOCUMENTS

| | | | | | |
|---|---|---|---|---|---|
| 2,675,012 | A | * | 4/1954 | Scales | B08B 3/006 134/111 |
| 3,960,728 | A | * | 6/1976 | Otzen | B01D 29/27 134/111 |
| 3,970,560 | A | * | 7/1976 | Metzger | B08B 3/006 134/111 |
| 3,971,394 | A | * | 7/1976 | Osborne | B08B 3/006 134/104.4 |
| 4,056,114 | A | * | 11/1977 | Boutillette | B08B 3/006 134/104.4 |

(Continued)

*Primary Examiner* — Robert James Popovics
(74) *Attorney, Agent, or Firm* — Wells St. John P.S.

(57) ABSTRACT

A system for collecting shaving remnants and excess lubrication fluids emanating from a mechanical cutting machine, comprising a catch basin, drain filter, quick connection couplings, fluid reservoir, and pump system for reticulating captured lubricating fluid. The catch basin securely fastens to a cutting machine, while the removable backsplash is deployed at an upstanding angle relative to the catch basin in order to capture superfluous materials liberated from a pipe threading, reaming or cutting tool work piece. The backsplash doubles as a sealable lid capable of retaining the contents of the catch basin eliminating unwanted spillage and allowing for safe transport. The fluid is filtered and collected within the fluid reservoir, whereafter a pump draws the oil through a second filter element to reuse the lubricating fluid in the tool operation to create a closed loop system. Quick connect fittings compartmentalize the system to prevent leaks during maintenance or service.

1 Claim, 6 Drawing Sheets

(56) References Cited

U.S. PATENT DOCUMENTS

| | | | | |
|---|---|---|---|---|
| 4,128,478 A * | 12/1978 | Metzger | ................. | B01D 23/00 134/111 |
| 4,673,081 A | 6/1987 | Habig | | |
| 4,787,531 A | 11/1988 | Gress | | |
| 5,067,591 A | 11/1991 | Fehlig | | |
| 5,324,425 A * | 6/1994 | Ellison | ................. | B03B 9/00 210/167.31 |
| 5,380,446 A * | 1/1995 | Bratten | ................. | B01D 37/00 184/6.24 |
| 5,395,537 A * | 3/1995 | Ellison | ................. | B03B 9/00 210/167.31 |
| 5,417,851 A * | 5/1995 | Yee | ................. | B01D 29/072 210/167.01 |
| 5,456,842 A * | 10/1995 | Kibblehouse | ........ | B01D 17/085 134/10 |
| 5,466,380 A * | 11/1995 | Bratten | ................. | B01D 37/00 137/399 |
| 5,499,643 A * | 3/1996 | Vincent, Jr. | ........ | B01D 17/0208 134/104.4 |
| 5,593,596 A * | 1/1997 | Bratten | ................. | B01D 37/00 137/399 |
| 5,772,900 A * | 6/1998 | Yorita | ................. | B01D 17/00 210/101 |
| 5,782,673 A * | 7/1998 | Warehime | ................. | B24C 1/045 451/2 |
| 5,830,369 A * | 11/1998 | Toyama | ................. | B28D 1/025 125/16.02 |
| 5,858,218 A * | 1/1999 | Setlock | ................. | B01D 29/014 210/167.01 |
| 5,908,349 A * | 6/1999 | Warehime | ................. | B24C 1/045 239/430 |
| 5,951,219 A * | 9/1999 | Stadtfeld | ................. | B23F 17/003 408/67 |
| 6,001,265 A * | 12/1999 | Toyama | ................. | B28D 1/025 209/5 |
| 6,096,198 A * | 8/2000 | Underhill | ........... | B01D 17/0202 210/123 |
| 6,110,386 A * | 8/2000 | Underhill | ........... | B01D 17/0202 210/167.02 |
| 6,162,355 A * | 12/2000 | Mizuno | ............. | B01D 21/2488 210/167.02 |
| 6,235,209 B1 * | 5/2001 | Bratten | ................. | B01D 29/15 210/167.09 |
| 6,299,393 B1 * | 10/2001 | Anders | ................. | B23F 17/003 409/12 |
| 6,375,547 B1 * | 4/2002 | Massenburg | ............ | B24C 1/045 239/433 |
| 6,495,031 B1 * | 12/2002 | Bratten | ............... | B01D 29/096 210/104 |
| 6,656,359 B1 * | 12/2003 | Osuda | .................... | B01D 61/14 210/636 |
| 6,805,618 B1 * | 10/2004 | Ward | ..................... | B24C 9/006 451/87 |
| 6,977,037 B2 * | 12/2005 | Mioc | ................. | B23Q 11/0057 210/167.01 |
| 7,052,378 B2 * | 5/2006 | Tateiwa | ................ | B24C 7/0007 451/453 |
| 7,052,599 B2 * | 5/2006 | Osuda | ................. | B01D 61/14 210/103 |
| 7,090,054 B2 | 8/2006 | Iwamasa | | |
| 7,172,689 B2 * | 2/2007 | Bratten | ............. | B23Q 11/0057 137/484.2 |
| 7,258,784 B2 * | 8/2007 | O'Ryan | ............. | B01D 39/1661 210/108 |
| 7,338,606 B2 * | 3/2008 | Bratten | ................. | B23Q 11/0057 137/484.2 |
| 7,381,323 B2 * | 6/2008 | Umezawa | ........... | B01D 29/114 210/108 |
| 7,387,478 B2 * | 6/2008 | Anderson | .......... | B23Q 11/0042 29/DIG. 79 |
| 7,410,569 B1 * | 8/2008 | Tilev | ................. | B01D 21/0012 210/167.02 |
| 7,775,854 B1 * | 8/2010 | Boman | ................... | B24B 55/12 451/8 |
| 7,824,547 B2 * | 11/2010 | Reynders | ............... | B01D 29/09 210/167.09 |
| 7,913,854 B2 * | 3/2011 | Bratten | ................. | B01D 33/04 210/400 |
| 8,029,670 B2 * | 10/2011 | Dietenhauser | ......... | B01D 29/01 210/232 |
| 8,157,992 B2 * | 4/2012 | Konig | ................... | B01D 61/14 184/6.24 |
| 8,361,313 B2 * | 1/2013 | Pancaldi | ................ | B01D 29/111 210/106 |
| 2002/0124694 A1 | 9/2002 | Vandiver | | |
| 2003/0121843 A1 * | 7/2003 | Bratten | ................. | B01D 29/096 210/398 |
| 2004/0159597 A1 * | 8/2004 | Lee | ........................ | B01D 17/00 210/167.29 |
| 2005/0031426 A1 * | 2/2005 | Hiramoto | ................. | B23Q 1/01 409/134 |
| 2005/0103695 A1 * | 5/2005 | Mioc | ................. | B23Q 11/0057 210/167.01 |
| 2005/0202764 A1 * | 9/2005 | Tateiwa | ................ | B24C 7/0007 451/87 |
| 2006/0045641 A1 * | 3/2006 | Anderson | .......... | B23Q 11/0042 409/137 |
| 2006/0207927 A1 * | 9/2006 | Tirakian | ................. | B24C 9/006 210/416.1 |
| 2013/0199987 A1 * | 8/2013 | Morris | ................... | B01D 35/30 210/323.1 |

* cited by examiner

FLUID LUBRICANT AND MATERIAL SHAVINGS RECAPTURE SYSTEM FOR A CUTTING OPERATION

CROSS REFERENCE TO RELATED APPLICATION

This application claims the benefit of U.S. Provisional Application No. 61/594,779 filed on Feb. 3, 2012, entitled "Oil & Shavings Containment System." The patent application identified above is incorporated here by reference in its entirety to provide continuity of disclosure.

BACKGROUND OF THE INVENTION

Field of the Invention

The present invention relates to a device for capturing debris created from threading, reaming or cutting tubular extrusions. More specifically, the present invention relates to securely capturing, storing and separating oil and excess shaving remnants expelled throughout the operation of a pipe-threading machine. A removable catch basin funnels expelled debris and fluid from the cutting operation in the system for filtering and recapture, and further protecting the surrounding environment from debris and lubrication fluid.

Pipe-threading machines are commonly known as a prominent means to fabricate necessary pipe lengths accurately and timely. The pipe is first inserted into a chuck utilized for rotating or clamping the pipe in a secure manner thereby providing accurate alignment for the desired function. A tool carriage allows the pipe to laterally translate along several support shafts through the use of a lever handle, which is the intended user interface. Once the pipe is situated properly a tool is selected to perform the anticipated work, such as an interchangeable die head to form a thread, a pipe cutter or a reamer. While the desired function is being performed a tremendous amount of friction, and therefore heat, may radiate along the pipe and selected tool thereby requiring a constant supply of a cooling and lubricating fluid, such as cutting oil, to allow for uniform and precise fabrication. The oil is sprayed over the work piece and typically falls into a receptacle located beneath a funneling apparatus where it remains for disposal or storage. The means to which the oil is captured and transported for storage, reuse or disposal is the main area of focus relating to the present invention, as well as maintaining a clean working environment by preventing excess spillage of material from a cutting operation such as pipe threading.

The lubrication and cooling fluid requirement for pipe-threading machines must be adhered to for proper function and increased longevity. Oil is constantly chosen for this function and delivered over the working area during operation in order to lubricate and cool not only the cutting blade but also the pipe itself directly counteracting tremendous amounts of friction inherent to the process of cutting and shaping tubular extrusions. By providing the lubrication oil, the longevity of the cutting blade is drastically increased and an accurate formation of the intended cutting function is ensured. A closed loop system providing continuous clean oil through the use of filtering and recycling represents the ideal solution, negating the need for users to transfer captured oil from an open receptacle. The open receptacle concept creates immediate opportunities for an unsafe and unsightly working environment through overfilling and tipping over of the receptacle utilized for capturing expelled oil.

Numerous possibilities arise for oil to escape the confines of a pipe-threading machine during its operation, including soiling the surrounding work environment the requires daily sanitation and the waste of lubrication oil after a single use. Safety and aesthetic concerns require the deployment of a system to capture the expelled oil in an efficient manner, yet many currently available devices and methods found in the art offer inadequate storage and recapture capabilities, thereby creating a risk of excessive oil spillage during the cutting tool operation and during transport, reuse or disposal of the collected oil thereafter. Further still, in cutting operations outside of the workshop and in outdoor environments, containing liberated fluids and shavings from the process is necessary to prevent the spread of remnants into the surrounding area, while providing an efficient collection and filtering system allows the oil to be reused in the process.

2. Description of the Prior Art

The present invention addresses the prominent shortcomings relating to oil and pipe shaving retention devices that commonly reside in the art. Depending on the type of work being performed, many devices are designed to meet specific needs in which the deployment of an oil capture system is compulsory. One of the foremost areas that deal with storing expelled oil stems from routine maintenance of machinery containing a combustion engine. Variously shaped receptacles have been fabricated to meet this need comprising additional embodiments such as handles, valves and filters yet all fail to propose a complete solution relating to efficiently capturing, storing, transporting and recycling lubrication oil necessary to perform certain cutting actions. A popular approach to capture expelled oil utilizes a stationary receptacle placed beneath a funneling mechanism thereby allowing oil to be freely collected. Numerous opportunities for spillage become evident with this method, such as the unintentional overfilling of the receptacle, the tipping over of the receptacle and spillage resulting from the collection process. The present invention addresses these shortcomings with a closed loop concept comprising various protective means to seal cavities storing the oil. Therefore, the present invention differs dramatically in both structure and spirit from devices currently found in the art and is ideally suited for capturing oil and shaving remnants associated with the operation a pipe-threading machine. The following devices are the most prevalent in the prior art relating to oil and shaving capturing devices.

U.S. Pat. No. 4,787,531 to Gress is a device in the art that describes a removable cover and seal for the purpose of sealing the oil reservoir of a power driven pipe-threading machine to negate any possible spillage of oil resulting from transport or intended storage. The sealing function is derived through the compression of a neoprene gasket located between the inner surface of the oil reservoir and cover's flange. This seal negates the possibility of oil spillage during transport or storage of the power driven pipe-threading machine, releasing a user from the burden of having to drain the oil confined therein. Although Gress's device provides a novel means to transport and store a power driven pipe-threading device it does not supply any capabilities to screen utilized oil for pipe shaving remnants nor does it allow for the recycling of oil from the oil reservoir. In this regard the present invention surpasses Gress's device in matters pertaining to its intended functionality.

U.S. Pat. No. 4,673,081 to Habig is one such device in the art that relates to a waste oil collector and storage kit comprising a rectangular receptacle, a lid, a cylindrical valve member, a spout for emptying the contained oil and a handle for transport. This device is a novel means to capture and retain oil but offers no capability to filter oil and shavings as well as safely recirculate expelled oil through the use of a closed system. Habig's device is ideal for use in conjunction with machines containing a combustion engine whereby changing and storing fluids are prominent priorities, not recirculation or filtration. Based on these issues the present device is superior to Habig's disclosure for containing, filtering and recycling oil when used in conjunction with pipe-threading machines.

U.S. Pat. No. 5,067,591 to Fehlig and U.S. Pat. No. 7,090,054 to Iwamasa are devices that describe a means to dispense a fluid lubricant comprising a manual hand pump capable of drawing the fluid lubricant from an enclosed source and directing that flow to a specified area. Fehlig's invention further discloses an embodiment comprising a pneumatic means to direct the flow of lubricant with increased pressure through the use of a compressed air source. Iwamasa's invention discusses the capability of separating oil and pipe shavings through the use of a dual tiered bucket assembly. Although these inventions pertain to a novel solutions for capturing and delivering lubricant they do not encompass the level of functionality as does the present invention. Fehlig's device does not securely fasten to a pipe-threading machine nor does it capture or separate the oil and pipe shavings that result from threading, cutting or reaming a pipe. Iwamasa's device does capture and separate the oil and pipe shavings expelled from a pipe-threading machine yet it relies on the free fall of utilized oil to a waiting receptacle. Once the oil is collected in Iwamasa's device numerous opportunities for spillage exist that directly correlate with an open loop solution. These problems include but are not limited to overflowing of the receptacle, the unintentional tipping over of the receptacle and spillage as a result of transport. This spillage would negate any possible energy expelled during the prior collection of excess materials. The present invention describes a closed loop concept where the captured oil and excess pipe shavings remain within the confines of the assembly once collected. In this regard the present invention surpasses Fehlig's and Iwamasa's device in matters pertaining to its intended functionality.

U.S. Patent Application Publication No. 2002/0124694 to Vandiver is another device that describes a means for capturing and storing pipe shavings as well as fluid lubricant emanating from a pipe-threading machine, comprising a splatter guard and backdrop. The splatter guard prevents oil and other associated remnants resulting from cutting, threading or reaming pipes to project beyond the vicinity of the pipe-threading machine. It is fabricated with a rectangular opening that tapers down forming a pyramidal shape with a backdrop capable of opening at a predetermined angle thereby preventing the aforementioned splatter of debris. Although this disclosure discusses a unique means to capture oil and pipe shavings from pipe-threading machine it still relies on a user to manually dispose of the unfiltered lubricant and shavings mixture by removing the stationary receptacle situated below the catch basin. The present device allows for the utilized lubricant to be filtered for pipe shavings while also allowing a generic hand pump to supply the filtered oil back to the pipe-threading machine for reuse. The closed loop concept of the present invention relies on sealed compartments and quick connect couplings to eliminate any unintentional spilling of oil during transport or recirculation.

From this brief description of prominent devices in the prior art, it is plainly gathered that the present invention provides a novel means to collect lubricating oil and shaving remnants resulting from the use of a cutting tool operations, and particularly pipe threading machines. It is submitted that the present invention is substantially divergent in design elements from the prior art. Consequently it is clear that there is a need in the art for an improvement to devices that provide a means to capture oil and shaving remnants during the operation of a pipe-threading machine. In this regard the instant invention substantially fulfills these needs.

SUMMARY OF THE INVENTION

In view of the foregoing disadvantages inherent in the known types of oil and shavings containment systems now present in the prior art, the present invention provides a new oil and shavings containment system wherein the same can be utilized for providing convenience for the user when collecting expelled oil and pipe shavings from a pipe-threading machine.

It is therefore an object of the present invention to provide a new and improved oil and shavings containment device that has all of the advantages of the prior art and none of the disadvantages.

It is another object of the present invention to securely fasten to a mechanical cutting tool below its work area to collect oil and mechanical shavings therefrom, and particularly pipe-threading machines commonly found in the art.

Another object of the current invention is to supply a catch basin having a removable backsplash for the purpose of protecting the surrounding work environment from oil splattering and liberated pipe shavings when used in conjunction with a pipe-threading machine. When deployed, the backsplash is situated both upward configuration with respect to the catch basin upper portion to collect oil splatter directed in an adjacent direction with regard to the tool work piece.

Another object of the present invention is to supply a catch basin with a sealable lower drain and a removable backsplash lid, which is capable of connecting to the catch basin when in a stowed state to create a closed container for captured pipe shaving debris therein.

Another object of the present invention is to provide an oil reservoir below the catch basin, whereby filtered lubricating fluid is collected and retained therein until being pumped, filtered again, and recycled in the original tool cutting operation.

Another object of the present invention is to provide at least two filter locations for which to first screen material shavings within the catch basin, and thereafter filter collected fluid within the reservoir therebelow before recycling the lubricating fluid in the tool cutting operation.

Another object of the present invention is to supply a quick connect fitting located on the underside of the catch basin for the purpose of providing a secure attachment to a drain hose.

Another object of the present invention is to provide a drain hose with a quick connect coupling that when disconnected from the quick connect fitting located on the underside of the catch basin will negate any oil spillage emanating from the catch basin or oil reservoir.

Another object of the present invention is to provide a device for the purpose of oil and pipe shavings containment that allows adequate clearance for a pipe wrench to assemble and disassemble fittings when used in conjunction with a pipe-threading machine.

Another object of the present invention is to provide a device for the purpose of oil and pipe shavings containment that allows adequate clearance for a working pipe of up to six inch diameter when used in conjunction with a pipe-threading machine.

Another object of the present invention is to provide a device that contains an oil reservoir with a hook capable of being suspended adjacent to the pipe-threading device.

Another object of the present invention is to provide a device that contains an oil reservoir comprising a flat bottom surface capable of resting on the same plane as the pipe-threading machine.

Another object of the present invention is to provide a device that contains an oil reservoir comprising a pressure vented cap for the purpose of maintaining a pressure equilibrium within the oil reservoir throughout extreme temperature changes.

Yet another object of the present invention is to provide a device that contains an oil reservoir comprising an appropriate fitting to secure a connection to a fluid pump for the purpose of drawing out and recycling any oil contained therein.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 4:
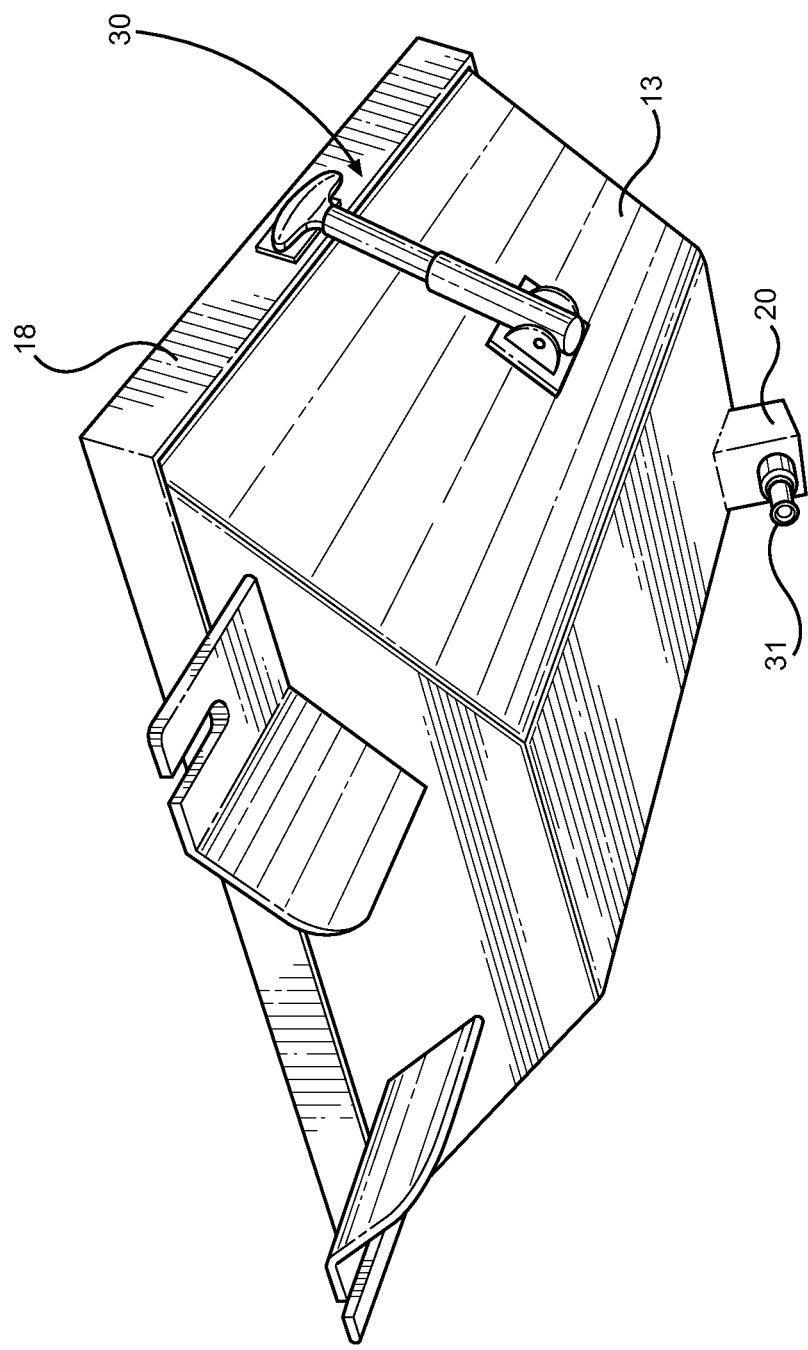

FIG. 4. shows an underside view of the catch basin and the drain fitting therebelow.

Figure 5:
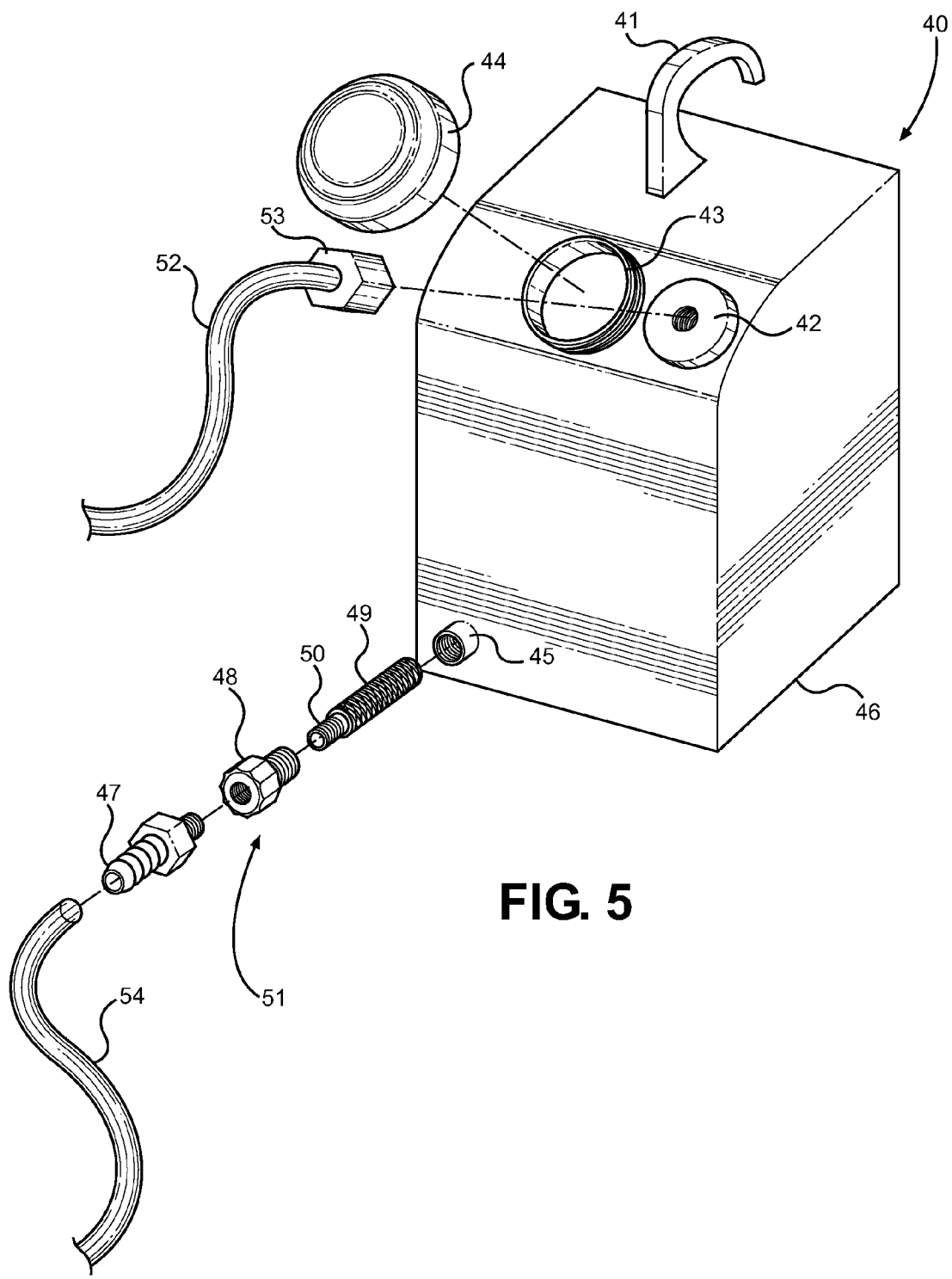

FIG. 5. shows a perspective view of the fluid reservoir adapted to connect to the catch basin drain fitting and house collected fluid therein before being recycled into the cutting operation.

Figure 6:
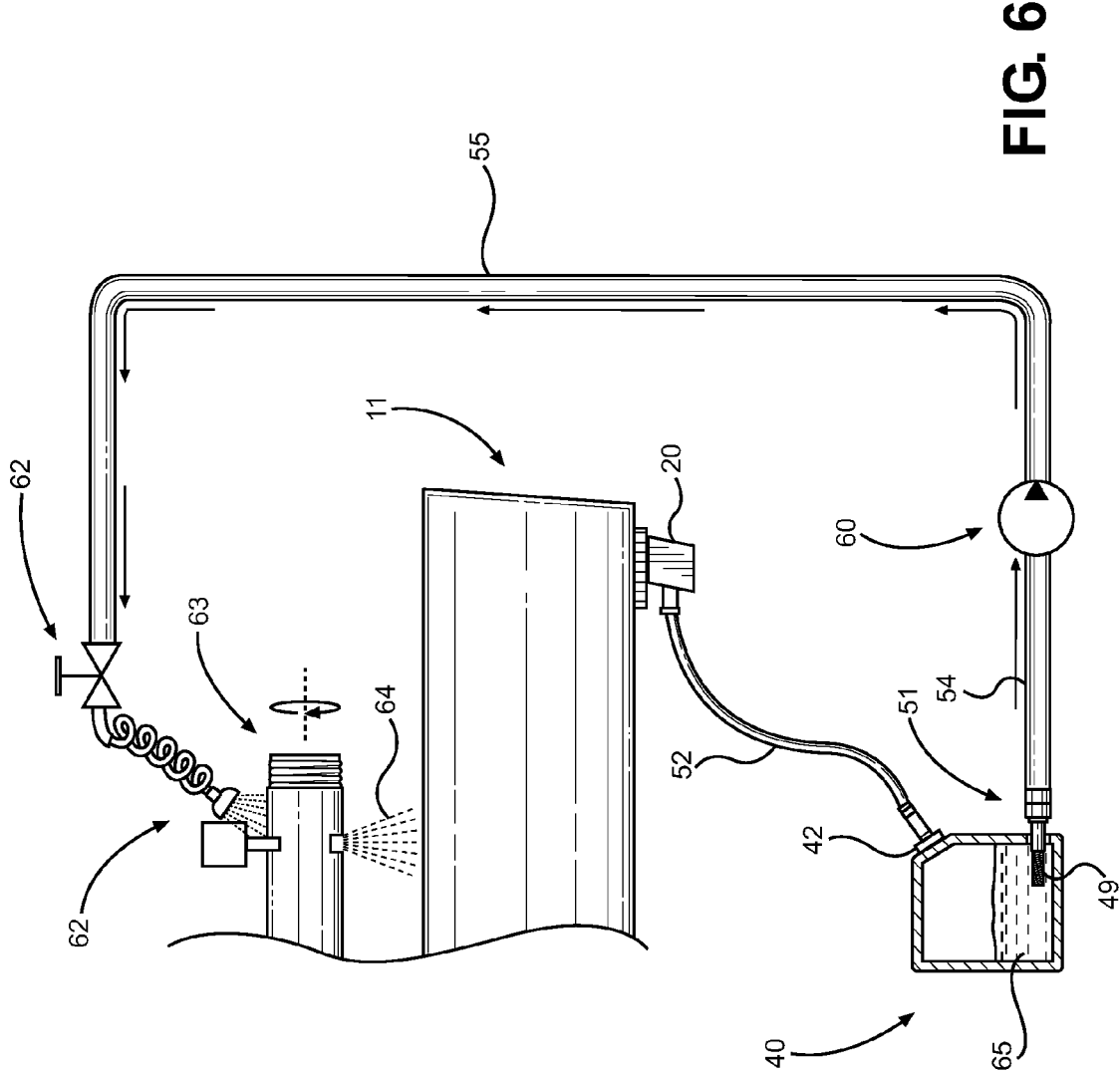

FIG. 6 shows a system view of the present invention, whereby lubricating fluid is collected from a cutting operation, filtered, pumped, and then recycled into the cutting operation to form a closed loop.

DETAILED DESCRIPTION OF THE INVENTION

Reference is made herein to the attached drawings. Like reference numerals are used throughout the drawings to depict like or similar elements of the oil and shavings containment device. For the purposes of presenting a brief and clear description of the present invention, the preferred embodiment will be discussed as used for containing and recycling oil from a mechanical cutting machine. The figures are intended for representative purposes only and should not be considered to be limiting in any respect.

The present invention discloses a lubricating fluid and material shaving containment system for use with a pipe-threading machine, which is utilized to perform cutting, reaming and other threading actions on elongated sections of material. The pipe-threading machine includes a reamer, a pipe cutter and interchangeable die head members having the capability to rotate a work piece along an axis and remove material as it rotates. When this work is performed, a lubricant is required to counteract any heat generation caused by inherent friction associated with cutting operation. Lubrication in the form of cutting oil is generally flowed over the work piece and the tool cutting element to ensure smooth operation, minimal heat increase, and improved precision. In a similar fashion, cutting devices such as milling machines, drill presses, and lathes also utilize cutting fluid during operation. The present invention contemplates a lubricating fluid and material containment system that captures the contents of the work piece expelled by the cutting process while remaining unobtrusive to the tool operation, allowing a user to manipulate and have access to the work piece when the system is in operation. The lubricating oil is collected, filtered, stored, and then re-circulated as fresh lubricating fluid for reuse while reducing waste, environmental cleanup, and cost to the operator.

Figure 1:
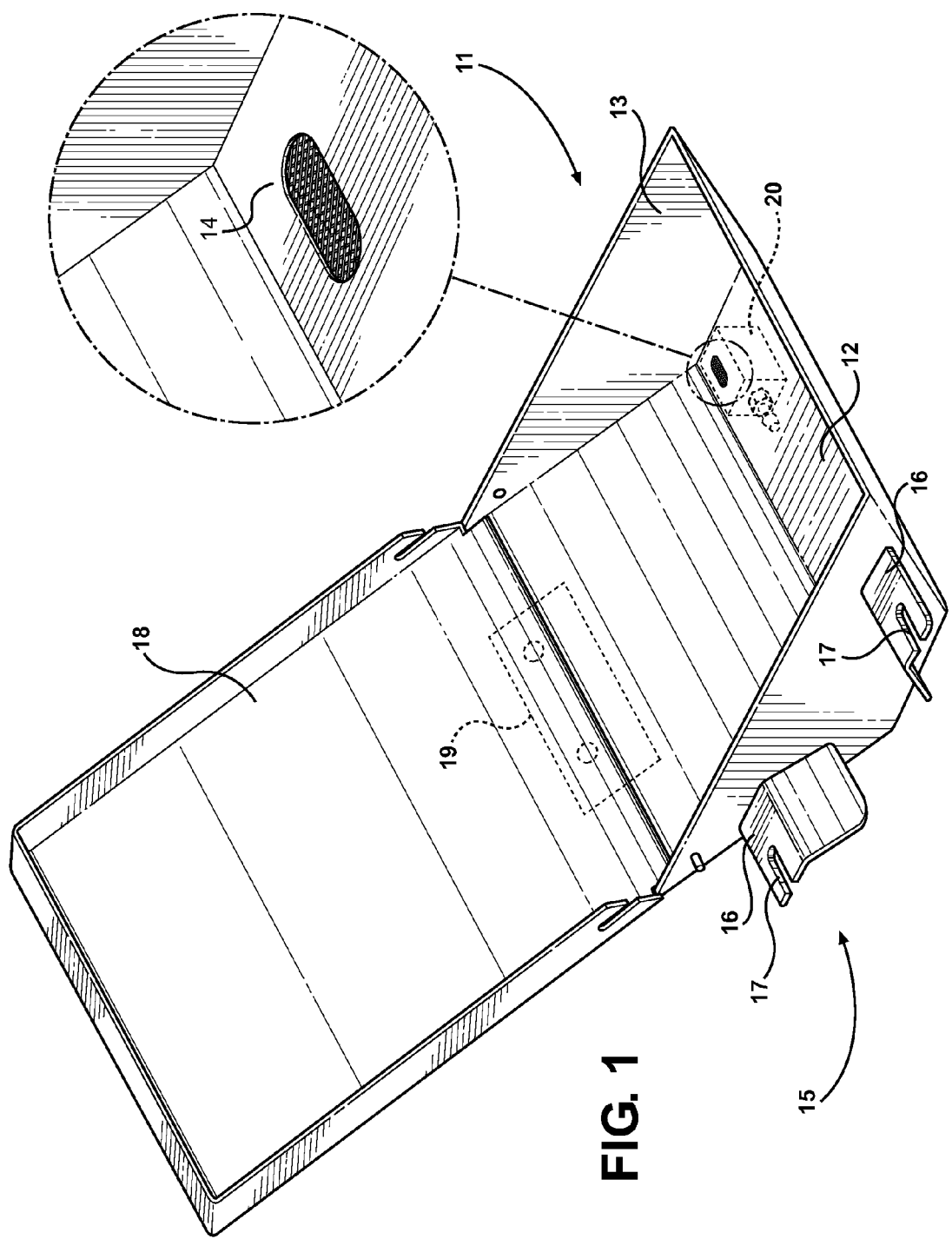
FIG. 1 shows an overhead perspective view of the catch basin of the present invention in a working state, whereby the basin would be securely attached to a mechanical cutting machine in an open configuration.

Referring now to FIG. 1, there is shown an overhead perspective view of the catch basin structure 11 of the present invention. This assembly is one that is adapted to connect directly to the cutting tool machine below the work piece and collect falling debris and cutting fluid. The assembly comprises an open interior, slanted or upstanding sidewalls 13, a base 12, a removable lid 18, a filtered drain 20, and a machine tool connection end 15. The removable lid 18 includes an attachment flange 19 that is adapted to create a groove within which the upper edge of the basin sidewall 13 is to fit therewithin, whereafter a plurality of captive fasteners located on a flange 19 bear against the sidewall 13 to lock the flange 19 and lid 18 into place. The flange 19 connects to the lid surface and is offset therefrom, providing a slot for which to slide the catch basin upper edge thereinto. When secured to the base sidewall, the lid 18 functions as a fluid backsplash that blocks flying debris and lubricating fluid in a given direction and diverts it into the basin interior for collection. This is useful for a turning operation where fluid may be directed away from a work piece in one primary direction, whereby the backsplash prevents the otherwise uncontrolled spread of material and lubricating fluid. Other fastening means such as clips, compression fittings, clamps and mechanical fasteners may also be suitable to provide the lid attachment. Further still, alternate means of connecting the lid and transitioning from a backsplash to a catch basin cover include a hinged connection in place of the flange 19. The slope of the backsplash 18 allows for captured oil and pipe shavings to gradually collect within catch basin before passing through a screened drain 14 along the basin base surface. After the separation of fluid and material remnants, the remaining fluid flows into a drain block 20 that is located below the catch basin 11, where it is funneled to an opening having a hose coupling attached thereto for evacuation of the fluid to a reservoir therebelow.

The machine tool attachment end 15 may comprise a number of different attachment elements, including slotted 17 flanges 16 that extend from the basin sidewall. In the embodiment shown in FIG. 1, the flanges 16 extend outward from the base sidewall and provide a slot 17 to secure fasteners therethrough, whereby the fasteners secure through the machine tool as well as the flanges 16 to support the basin in a cantilevered position therefrom. It is not desired to limit the present invention to a specific machine tool connection means, but rather to disclose a working embodiment that has been shown to be functional with a pipe cutting machine. Other embodiments include different flange designs and coupling means, including fasteners, clamps, and the like, whereby the basin and its contents are securely supported in a horizontal and cantilevered position from the tool and below the tool work piece.

Figure 2:
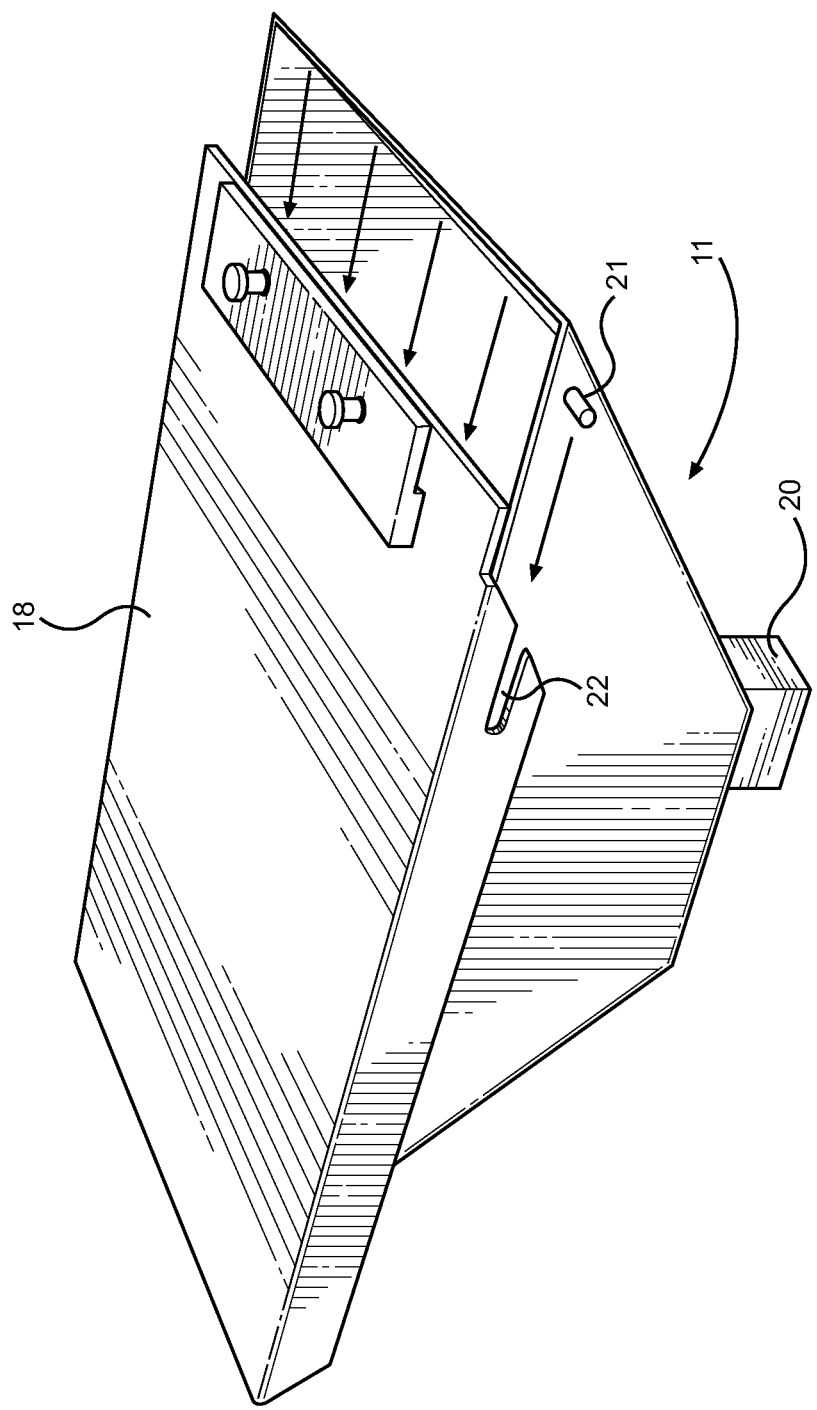
FIG. 2 shows a side perspective view of the catch basin transitioning from a closed state to a working state.

Referring now to FIG. 2, there is shown perspective view of the present catch basin 11 transitioning from a closed container to an operating catch basin, whereby the lid 18 is slide from its connect to the basin upper perimeter before being secured against one of its edges. The removable lid 18 cover serves the function of a lid to the basin and as a splashguard when the attached machine tool is in operation. As a basin cover, the lid 18 is dimensioned to securely encompass the catch basin opening, safeguarding the contained fluid and debris contents therein. As a backsplash, the lid 18 protects the surrounding environment by diverting sprayed fluid and shaving remnants expelled from a cutting action. The lid 18 is made up of a top surface and three flanges that extend downward from the top surface to overlap three edges of the basin 11 upper perimeter edge. The front flange is angled to align with the angled sidewall of the basin 11, establishing a secure seal thereover. Along the side flanges is a slotted member 22 adapted to accept a dowel 21 protruding from the basin sidewall surface to ensure proper alignment for the assembly and secure fitment once the lid 18 has been firmly engaged against the base upper perimeter. These dowels may also be designed as static members, press fit pins, threaded inserts, spring loaded push pins, or even clamp members.

Figure 3:
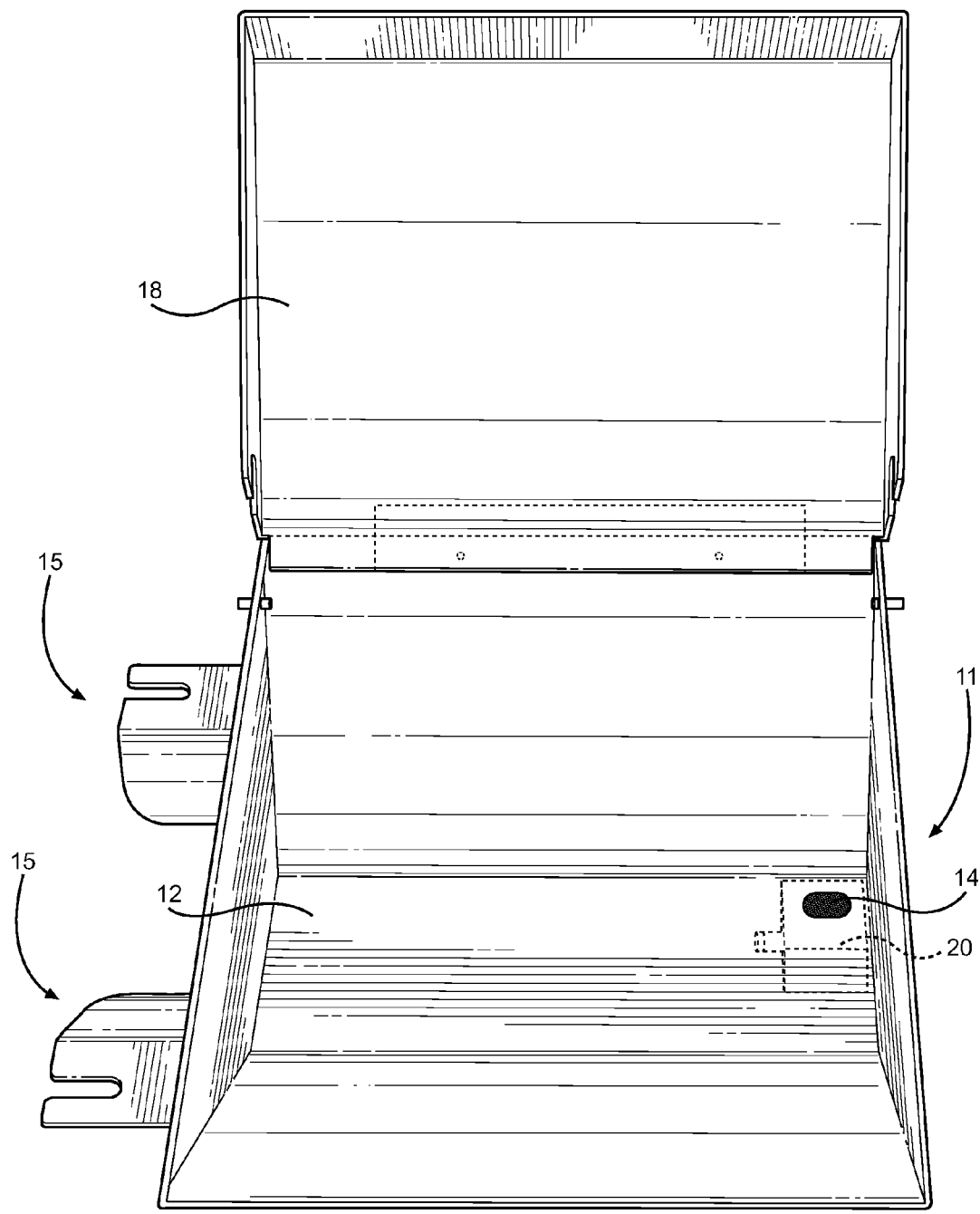
FIG. 3 shows an overhead view of the catch basin in a working state.

The angled sides of the catch basin 11 provide a means to flow fluid and material shavings from the open upper portion of the basin 11 to the lower drain block 20. The opening to the drain block 20 is placed at the lowest point in the basin such that fluid naturally flows into its screened opening. The screen 14, as shown in FIGS. 1 and 3, is a filter element that removes particles and debris from the fluid as it drains into the drain block 20. From the drain block 20, the screened fluid is routed through a hose into a lower reservoir, wherein the fluid collects and can be filtered again and pumped to the lubricating fluid nozzle on the cutting machine for reuse. Alternatively the reservoir can be used as a static assembly to collect the fluid for manual reuse, recycle, or disposal.

Referring now to FIG. 3, there is shown an overhead view of the catch basin 11 in an open and working state. The basin design may take on several different designs, geometries, and sizes depending on the application and the end user. The primary goal is to provide a catch basin having a large upper opening with angled sidewalls, a lower drain 20, a lid 18 that is securable over the basin opening or securable thereto as a backsplash element, and finally provide a connection means 15 for supporting the catch basin 11 in a horizontal configuration against a machine tool during deployment. The connection means preferably comprises a first and second flange or mounting bracket, located along on sidewall, which are designed to securely attach to a cutting machine using a slotted engagement. These slotted openings will slide onto loosened bolts located on the underside of a cutting machine thereby affixing the flanges to the machine. Currently envisioned, the mounting brackets contain a flat surface parallel to the open upper portion of the catch basin with a bent portion that protrudes inwards towards the center of the catch basin and downwards. The shape of the mounting flanges can be altered with sharper bends, rounded edges or the elimination of material to negate any anticipated interference or safety concerns.

Referring now to FIG. 4, there is shown an underside perspective view of the present invention and the lid latch element 30 that secures the lid 18 in a closed position along the top of the basin. The latch 30 draws the angled front flange of the lid 18 against the angled upper edge of the basin, forcing the lid against the dowel elements along the backside of the basin. This compresses the lid against the basin upper periphery and bears the lid against the protruding dowels, ensuring the lid remains secured if the basin is transported with any fluid contents therein. The latch 30 is preferably a hinged, spring loaded element that is latched over a tab or catch along the lid frontal flange. The catch makes positive connection with the latch, whereafter the spring tensions the latch 30 there against and draws the lid 18 against the basin. The latch 30 is mounted along a sidewall 13 opposite of the dowels, whereby the lid 18 is pull against the dowels for support.

Also visualized in FIG. 4 is the drain block 20 and the hose coupling 31 protruding therefrom. The coupling 31 is preferably a drain hose quick disconnect fitting or bung, which allows a drain hose to be quickly attached thereto or removed therefrom. Fluid from the catch basin drains into the drain block 20 and flows into the coupling 31, which preferably has a hose attached thereto to drain the fluid into a lower reservoir for further storage or reuse.

Referring now to FIG. 5, there is shown an exploded view of the fluid reservoir 40 of the present system. The fluid reservoir 40 comprises a housing having an interior volume to store fluid drawn from the catch basin. The base 46 of the reservoir is flat to allow it to be placed on a floor surface, or alternatively a hook 41 along its upper surface is used to hang the assembly from a machine tool ledge. The elements of the reservoir comprise a sealable housing having an interior volume, a fill cap 44, a catch basin hose connection 42, and a lower reservoir drain fitting assembly 51. The fill cap 44 is a threaded cap that allows fluid to be poured directly into the reservoir 40 or poured directly therefrom, without requiring a pump device or connection of fill or drain hoses. The catch basin hose connection 42 is a threaded or quick disconnect coupling that allows connection to the drain hose 52 attached to the catch basin drain block, whereby a suitable hose connector 53 element is utilized to make positive and sealed engagement with the reservoir. Preferably the fill cap 44 and catch basin hose connection 42 are mounted along an angled surface to promote fluid flow while preventing vacuums from developing in the reservoir during filling or draining operations.

The reservoir drain fitting assembly 51 comprises several elements that first filter the reservoir fluid and then provide support for a reservoir drain hose 54. Along the lower portion of the reservoir is a fluid outlet or threaded drain aperture 45 that supports a filter screen 49 and a hose connector element 47. Fluid flows through the screen 40 to remove fine contaminants therein, whereafter the fluid enters through the hose coupling 47 and into the drain hose 54. This assembly may take any form that allows communication of fluid into the drain hose 54 while supporting the fluid screen element 49 within the interior of the reservoir 40. Preferably, this assembly comprises three way fitting: a hose coupling 47 that threadably connects to a threaded, bored, and tapped bolt 48, which further threadably supports the filter element within the bore and threadably connects to the reservoir drain aperture 45. The screen 49 is supported by a bored, threaded end that couples the screen 40 to the bored bolt 48 such that the screen 49 is supported within the reservoir interior when entered through the drain aperture 45. The drain hose 54 connects preferably connects to a pump device for pumping the fluid within the reservoir for reuse or transfer to another location.

Referring now to FIG. 6, there is shown a system view of the present invention. In this view, the machine cutting tool operation 63 is shown above the catch basin 11 of the present invention. Lubricating fluid and material from the work piece are deposited 64 within the basin 11, whereby the open structure of the basin and the upstanding splashguard divert the tool remnants into the basin interior and towards the screened drain block 20. The solid particles are filtered from the fluid, whereafter the fluid drains into the drain block 20 and into the catch basin drain hose 52. The drain hose 52 connects 42 to the reservoir to deposit the fluid 65 into the reservoir 40 interior for collection. The fluid 65 is filtered 49 a second time before being evacuated from the reservoir 40 through a second drain hose 54 using a pump device 60. The pump 60 is preferably a hand pump that the user can exercise to manually draw fluid from the reservoir, or alternatively may be an electric pump assembly that selectively pumps fluid 65 on demand.

From the pump 60, the filtered fluid is flowed through a final hose 55 to a valve 62 or to a tool lubricant reservoir to be metered 62 onto the work piece. In this way, the fluid is recycled within a closed loop system, whereby the fluid is first used in the cutting process, collected, filtered, and then re-circulated into the cutting process. The basin 11 is placed below the work piece while the backsplash is placed in a location to divert sprayed fluid and debris, whereafter the fluid is collected within a closed system that eliminates wasted cutting fluid and reduces work environment hazards and messes. Fluid otherwise ejected from the work piece is collected on the adjacent surfaces, while shavings and material remnants are left to be collected within the dispersed fluid. This creates a fire risk and an environmental hazard, not to mention an unclean work area. The present system provides a means to collect, recycle, and separate the byproducts of a cutting operation for both convenience and safety of the user.

The present invention improves the traditional means of catching and straining byproducts of a machine cutting operation. Materials contemplated for the fabrication of catch basin, drain hoses, hose couplings, and fittings are commonly known in the art and should be designed to maintain the necessary standards for continuous work in machine shop environments. All tubing associated with the device can be fabricated from plastics, rubber and composites deemed suitable for constant exposure with fluid lubricants. Lubricating oil is a preferred means to provide cooling and lubrication during a cutting action yet other fluid lubricants may be substituted providing they produce similar results. Various sizes of quick connect couplings, fittings and hoses are commonly found in the art and typically come in an assortment of metals or plastics along with industry standard thread lengths.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cutting fluid lubricant circulation system comprising:
a catch basin positioned below a work piece for capturing cutting fluid and material remnants from said work piece, said catch basin having a drain;
a filter element within said drain, said filter element removing particles and debris from the cutting fluid as it drains from the catch basin into a drain block, thereby producing filtered cutting fluid;
a reservoir fluidically connected to said drain block for collecting said filtered cutting fluid, wherein filtered cutting fluid flows from said drain block through a hose into said reservoir which is below said catch basin; and
a fluid pump fluidically connected to said reservoir for evacuating said reservoir, said fluid pump pumping said filtered cutting fluid through a second filter element positioned at a reservoir fluid outlet to a hose to a valve to meter filtered cutting fluid onto said work piece.

* * * * *